Patented Sept. 7, 1954

2,688,538

UNITED STATES PATENT OFFICE 2,688,538

PHOTOGRAPHIC ELEMENTS AND PROCESS OF COLOR CORRECTION UTILIZING STYRYL DYES AS COUPLERS

Karl Otto Ganguin and Eric Macdonald, Blackley, Manchester, England, assignors to Imperial Chemical Industries Limited, a corporation of Great Britain No Drawing. Application July 10, 1950, Serial No. 172,998

Claims priority, application Great Britain July 15, 1949

6 Claims. (Cl. 95—2)

This invention relates to a colouring composition and process and more particularly to an improved colour photographic emulsion and an improved process for colour photography.

The dyestuffs and pigments used in practice in subtractive processes of colour photography do not possess ideal spectral absorption curves. In addition to absorbing light in the desired part of the spectrum, they also absorb some light in other parts of the spectrum and as a result of this the colour reproduction is never ideal. For example, magenta dyestuffs formed by colour development from colour formers of the pyrazolone series absorb the desired complementary coloured green light and in addition absorb undesirably a certain amount of blue light. It has been proposed (see for example The Journal of the Photographic Society of America, volume 13, 94–96, February 1947) to correct for these deficiencies by the use of an automatic masking method whereby coloured colour formers are used, the light absorption of the colour former being equal or approximately equal to the undesired light absorption of the developed dyestuff. For example the colour former which is used in a photographic layer to form a magenta dyestuff on colour development may itself be coloured yellow so that it absorbs blue light at an intensity equal to the undesired blue absorption of the magenta dyestuff formed by colour development. Accordingly the unchanged colour former itself forms the coloured mask and the blue absorption of the photographic layer is a constant value (irrespective of the green absorption of the magenta image) which can be compensated for by using a suitable filter when printing.

The coloured colour formers it has been proposed to use in the above process are compounds containing the group —N=N—R' where R is an aromatic or heterocyclic radical. The —N=N—R group is split off during the development with an aromatic amino compound and replaced by the phenylimino radical derived from the aromatic amino compound.

Also as coloured colour formers for this purpose it has been proposed to use compounds of the formula:

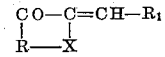

wherein R represents the atoms required to complete a 5- or 6-membered hetercyclic nucleus, $R_1$ represents an aryl radical which may be substituted and X represents S, Se, O, benzo or carbonyl groups.

The main practical objection to the use of the coloured colour formers hitherto known for use in this automatic masking method is that the reaction of such colour formers with the primary aromatic amino compounds used for development is undesirably slow.

In British specification No. 513,596 it has been proposed to produce coloured photographic images by developing a reducible silver salt image with an aromatic compound as the developer, and in the presence of a colour former which is the condensation product of an aldehyde or a ketone with a pyrazole-5-one having a reactive methylene group in the 4-position and in which the 1 and 3 positions may or may not be substituted, the condensation linkage occurring in the said methylene group, and said condensation product containing one nucleus of the pyrazole-5-one or at the most two such nuclei. The substituents in the 1 and 3 positions may be for example aryl or higher alkyl groups, and among the colour formers mentioned is 1-phenyl-3-methyl-4 - p - dimethylaminobenzal - 5 - pyrazolone. It is said that the colour former can be incorporated in the emulsion, but there is no suggestion in the specification that the residual colour former could be used for masking purposes. Also none of the colour formers mentioned in the British specification No. 513,596 contain sulphonic or carboxylic acid groups, and it is clear that colour formers containing such groups were not intended to be used in the process, since it is said in the specification that the derivatives of the pyrazole-5-ones to be used in accordance with the invention are more suitable than the pyrazole-5-ones from which they derived, as they are less soluble and when incorporated in the emulsion do not have as great a tendency to diffuse from one emulsion layer to another emulsion layer, or to dissolve in the developer.

We have found that certain yellow styryl dyestuffs as hereinafter defined are valuable for use as colour couplers in automatic masking processes, in that they couple rapidly with aromatic amines and in general they couple more quickly than the hitherto known magenta colour formers used in automatic masking processes, and they also possess the absorption characteristics necessary to compensate accurately for the undesired absorption of the magenta dyestuffs obtained by coupling with an aromatic amine.

If desired mixture of one or more of our coloured colour formers and one or more uncoloured colour formers may be used to obtain any desired relative density of the mask and the dyestuff image.

The styryl dyestuffs used as magenta colour formers in the process of our invention are the water-soluble yellow dyestuffs containing a sulphonic or carboxylic acid group, a substituent which renders the dyestuff fast to diffusion in gelatin emulsions, and the grouping

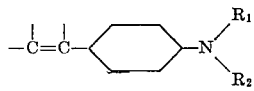

wherein the benzene nucleus may be substituted, wherein the terminal carbon atom is the omega-carbon atom of a cyanoacetyl radical or forms part of a heterocyclic nucleus, and wherein at least one of the radicals $R_1$ and $R_2$ is an alkyl radical substituted with for example, —CN, —COOAlkyl, —$NO_2$ carboxyl or sulphonic acid groups, and, when only one of the radicals $R_1$ and $R_2$ is an alkyl radical so substituted, the other radical is a substituted or unsubstituted hydrocarbon radical.

These styryl dyestuffs are obtainable by condensing an anil of a p-substituted-amino-benzaldehyde with a reactive methylene compound of the kind used for forming magenta dyestuffs in colour photography by reaction with colour developers. These reactive methylene compounds may be for example, compounds of the pyrazolone series or of the cyanoacetyl- series.

Specific examples of suitable reactive methylene compounds are 1-(4'-phenoxy-3'-sulphophenyl)-3-heptadecyl-5-pyrazolone, 1 - (phenyl-3' - methanesulphonic acid)-3-heptadecyl-5-pyrazolone, and the compound obtained by acylating 4-omega-cyanoacetoaniline with octadecenylsuccinic anhydride.

Examples of suitable p-substituted aminobenzaldehyde are p - (N - methyl-N-$\beta$-hydroxyethylamino)-benzaldehyde, p-(N-ethyl-N-$\beta$-hydroxy-ethylamino)-benzaldehyde, p-($\beta$:$\beta'$-dihydroxydiethylamino)-benzaldehyde, p-(N-methyl-N - methoxyethylamino)- benzaldehyde, p -(N-ethyl-N-methoxyethylamino)-benzaldehyde, p-(N - butyl - N-$\beta$-hydroxymethylamino)-benzaldehyde, p-(N-methyl - N - $\beta$ - chloroethylamino)-benzaldehyde, p-(N-ethyl-N-$\beta$-chloroethylamino)-benzaldehyde, p - ($\beta$:$\beta'$ - dichlorodiethylamino) - benzaldehyde, 4 -($\beta$:$\beta'$dichlorodiethylamino)-2-methylbenzaldehyde, p-(N-methyl-N-$\beta$-cyanoethylamino)-benzaldehyde, p-($\beta$:$\beta'$-dicyanodiethylamino)-benzaldehyde, p-(N-methyl-N - $\beta$ - carboxyethylamino) - benzaldehyde, p-di-(carboxylmethyl)-amino-benzaldehyde, and the corresponding diethyl ester, p-($\beta$:$\beta'$-dicarboxydiethylamino)-benzaldehyde, p-(N-methyl-N-$\beta$-sulphoethylamino)-benzaldehyde, 4-($\beta$:$\beta'$-disulphodiethylamino)-2-methylbenzaldehyde.

The n-cyanoalkyl or N-dicyanodialkyl-substituted p-aminobenzaldehyde may be made by treating the corresponding hydroxyalkyl or dihydroxydialkyl anilines with phosphorus pentabromide, treating the corresponding bromoalkyl or dibromodialkyl compounds so obtained with potassium cyanide, and introducing the aldehyde group by reaction with phosphorus oxychloride and N-methylformanilide and subsequent hydrolysis, that is to say by the methods of Vilsmeier and Haack (Berichte, volume 60, page 119).

The diethyl ester of p-di-(carboxymethyl)-aminobenzaldehyde may be made by introducing the aldehyde group into p-di-(ethylcarboxymethyl)-aniline by the method of Vilsmeier and Haack and the free acid may be obtained by hydrolysis of the ester. The other mono- or di-(carboxyalkyl) derivatives may be made by hydrolysis of the appropriate cyanoalkyl compounds, and the esters may be made by reacting the acids with the appropriate alcohol. The mono- and di-(sulphoalkyl) derivatives may be made by the action of sodium sulphite on the corresponding chloroalkyl compounds.

The aldehyde may be converted to the corresponding anil by condensing it with aniline or a substituted aniline, for example aniline sulphonic acid and the reaction of the anil with the reactive methylene compound may be effected by mixing the reagents together in weakly alkaline aqueous medium, or by heating in methanol with a catalyst such as piperidine or triethylamine.

By a substituent which renders the compound fast to diffusion, we mean any substituent which is known from the literature to reduce substantially or suppress the diffusion of colour former or dyestuff in the emulsion layer, for example an alkyl radical with a carbon chain of at least 5 carbon atoms.

According to our invention we provide a light sensitive silver halide emulsion for use in colour photographic processes which contains as a magenta colour former a homogeneously distributed water-soluble yellow styryl dyestuff as hereinbefore defined.

According to a further feature of our invention we provide a multilayer photographic element for use in colour photographic processes which comprises a base and at least three silver halide emulsion layers, sensitive to different parts of the spectrum, one such layer containing as a magenta colour former, a homogeneously distributed water-soluble yellow styryl dyestuff as hereinbefore defined.

According to a still further feature of our invention, we provide an improved process for making a colour corrected colour photographic record which comprises developing with a colour forming developer a latent image bearing photographic element obtained by exposing to light a photographic element comprising a base and at least three silver halide emulsion layers sensitive to different parts of the spectrum, one such layer containing as a magenta colour former, a homogeneously distributed water-soluble yellow styryl dyestuff as hereinbefore defined.

The process of our invention is particularly valuable for use in three colour subtractive processes of colour photography in which there are used multilayer films which contain yellow, magenta and cyan formers in three separate layers and in which the colours are produced in the layers by developing the films with colour forming developers, for example with alkaline solutions of aromatic amino compounds, such as for example p-diethylaminoaniline. In such processes a colour mask is mainly required in the "magenta layer" (that is the layer containing the magenta dyestuff), to correct for the imperfect light absorption of the latter.

As the yellow and cyan colour formers for use in the process of our invention, there may be used those yellow and cyan colour formers which are customarily used in three colour subtractive processes of colour photography in which the colours are developed by treating the exposed film with alkaline solutions of aromatic amino compounds. As yellow colour formers there are preferably used compounds of the acylacetylarylamide series, for example p-stearyl-amino-benzylacetanilide-p'-carboxylic acid, and as cyan colour formers there are preferably used compounds of the 1-naphthol series, for example the product obtained by condensing 1-hydroxy-2-naphthoyl chloride with oleylamine and sulphonating.

The process of our invention may be used to obtain positive masking images alongside the normal negative images obtained by exposure and primary colour development. Alternatively it may be used in association with reversal processes so that negative masking images are obtained alongside the normal positive images and this forms a still further feature of our invention. For example the multilayer material is exposed to light from an object or to light transmitted by a colour transparency, developed with a black and white developer, re-exposed to uniform light and developed with a colour forming developer, the developed silver bleached, and finally fixed.

The layers in the multilayer photographic element may be so sensitised that the developed photographic image is in colours complementary to those of the light to which the element is exposed, but if desired other combinations of colour former and sensitiser can be used, for example the red sensitive layer may contain the magenta colour former, the green sensitive layer, the cyan colour former and the blue sensitive (that is not spectrally sensitised) layer the yellow colour former.

The invention is illustrated but not limited by the following examples in which the parts are by weight:

*Example 1*

A multilayer light sensitive photographic film is made up as follows:

A red sensitive silver halide emulsion layer containing 10 grams per litre of the cyan colour-forming component obtained by condensing 1-hydroxy-2-naphthoic acid chloride with oleylamine and sulphonating (that is the component described in Example 10 of British specification 465,823) is coated on a transparent support and on this layer there is coated a green-sensitive silver halide emulsion layer containing 10 grams per litre of the yellow styryl dyestuff 1-(4'-phenoxy - 3' - sulphophenyl) -3-heptadecyl-4-p-omega:omega' - dicyanodiethylamino - benzylidene-5-pyrazolone (sodium salt), to act both as the magenta colour-forming component and also as the yellow masking dyestuff. A layer of colloidal silver is now coated on to act as a yellow filter layer, and finally as top layer a blue sensitive emulsion containing 10 grams per litre of p-stearylamino - benzoylacetanilide - p' - carboxylic acid (the yellow colour forming component described in Example 3 of British specification 486,848). The film is exposed to the light from a coloured object and then developed in a solution of the following composition:

| | Parts |
|---|---|
| p - N:N - diethylaminoaniline hydrochloride | 3 |
| Sodium sulphite, anhydrous | 1 |
| Sodium carbonate, anhydrous | 60 |
| Potassium bromide | 2 |
| Water to make up to | 1,000 |

The film is washed and transferred to a bleaching bath solution made up according to the following recipe:

| | Parts |
|---|---|
| Potassium ferricyanide | 100 |
| Potassium bromide | 25 |
| Water to make up to | 1,000 |

The film is further washed, and finally fixed in a 25% aqueous solution of sodium thiosulphate.

This processed material contains in the first layer a cyan dyestuff negative image, in the second layer a magenta dyestuff negative image and a yellow styryl dyestuff positive image which serves as a mask to correct for the undesirable absorption of blue light by the magenta dyestuffs and in the top layer a yellow dyestuff negative image.

When the negative transparency so obtained is used for making positive prints, duplicate negatives, or separation negatives, the colour fidelity and reproduction are improved compared with reproduction from negative transparencies which have not been masked as described herein.

The styryl dyestuff used in the above example may be obtained by condensing p-omega-omega'-dicyanodiethylamino-benzaldehyde with 1-(4'-phenoxy-3'-sulphophenyl) -3 - heptadecyl-5-pyrazolone.

*Example 2*

A multilayer light sensitive photographic film is made up as described in Example 1 except that in place of the yellow styryl dyestuff used in Example 1, there is used 1-(4'-phenoxy-3'-sulphophenyl) -3-heptadecyl-4 - p-di-(ethylcarboxymethyl) -aminobenzylidene-5-pyrazolone (sodium salt) of the following structure:

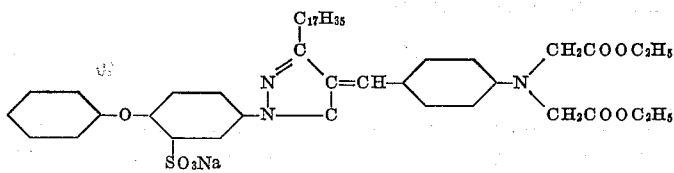

obtainable by condensing p-di-(ethylcarboxymethyl) -aminobenzaldehyde with 1-(4'-phenoxy-3'-sulphophenyl) -3-hepta-decyl-5-pyrazolone.

The film is exposed and processed as described in Example 1 when a similar result is obtained.

*Example 3*

In place of the yellow styryl dyestuff used in Example 1 there is used 1-(phenyl-3'-methanesulphonic acid) -3 - heptadecyl-4-p-N-methyl-N-carboxyethyl - aminobenzylidene - 5 - pyrazolone (sodium salt) which may be obtained by condensing the anil of p-N-methyl-N-carboxyethyl-amino-benzaldehyde with 1-(phenyl-3'-methanesulphonic acid) 3-heptadecyl-5-pyrazolone, which may be made by condensing phenylhydrazine-3-methanesulphonic acid with stearoylacetic ester.

The film is processed as described in Example 1.

*Example 4*

In place of the yellow styryl dyestuff used in Example 1 there is used 1-β-octadecenyl-succinamido-4-(omega-cyano-omega - 4'-N-methyl-N-omega' - cyano - ethylamino-benzylidene) -acetobenzene, which may be made by condensing 4-N-methyl - N - omega-cyano-ethylaminobenzaldehyde with the compound obtained by acylating 4- omega-cyano-acetoaniline with octadecenyl-succinic anhydride and has the following structure:

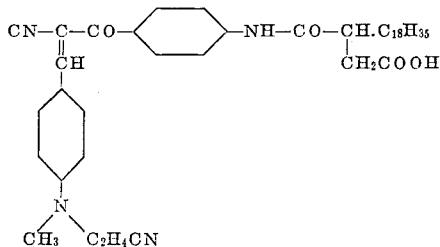

The film is processed as described in Example 1.

We declare that what we claim is:

1. A multilayer photographic element for use in color photographic processes which comprises a base and at least three silver halide emulsion layers, sensitive to different parts of the spectrum, one such layer containing as a magenta color former a homogeneously distributed water-soluble yellow styryl dyestuff, said yellow styryl dyestuff having the general formula

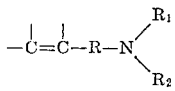

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside of the said

grouping a substituent which renders the dyestuff fast to diffusion in gelatin emulsions and a substituent selected from the class consisting of sulfonic acid and carboxylic acid groups.

2. An improved process for making a color-corrected photographic record which comprises developing with a color-forming developer a latent image bearing photographic element obtained by exposing to light a photographic element comprising a base and at least three silver halide emulsion layers sensitive to different parts of the spectrum, one such layer containing as a magenta color former, a homogeneously distributed water-soluble yellow styryl dyestuff, said yellow styryl dyestuff having the general formula

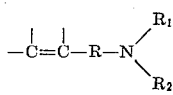

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside of the said

grouping a substituent which renders the dyestuff fast to diffusion in gelatin emulsions and a substituent selected from the class consisting of sulfonic acid and carboxylic acid groups.

3. An improved process for making a color-corrected color photographic record which comprises exposing a multilayer photographic element as set forth in claim 1 to the light from an object or to light transmitted by a color transparency, developing with a black and white developer, re-exposing to uniform light, developing with a color-forming developer, bleaching the developed silver and fixing.

4. A light sensitive silver halide emulsion for use in color photographic processes which contains as a magenta color former a homogeneously distributed water-soluble yellow styryl dyestuff, said yellow styryl dyestuff having the general formula

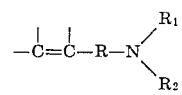

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside of the said

grouping a substituent which renders the dyestuff fast to diffusion in gelatin emulsions and a substituent selected from the class consisting of sulfonic acid and carboxylic acid groups.

5. A light-sensitive photographic element comprising a base having at least one light-sensitive silver halide emulsion layer thereon, said emulsion layer having included therein a homogeneously distributed water-soluble yellow styryl dyestuff as a magenta color former, said dyestuff having the general formula

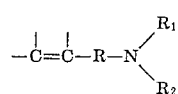

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside of the said

grouping a substituent which renders the dyestuff fast to diffusion in gelatin emulsions and a substituent selected from the class consisting of sulfonic acid and carboxylic acid groups.

6. In a process for obtaining a color-corrected photographic record involving the steps of exposing to light a photographic element comprising a base and a light-sensitive silver halide emulsion layer containing a magenta color former which corrects for undesired absorption by the magenta image formed, upon development, by coupling of the color former with an aromatic amine, and thereafter, developing with the aromatic amine to obtain the magenta image and correction therefor, the improvement which comprises utilizing, as the magenta color former, a water-soluble yellow styryl dyestuff having the general formula

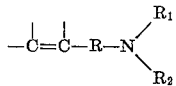

wherein R is a monocyclic aryl radical, the terminal carbon atom is selected from the group consisting of the omega-carbon atom of a cyano acetyl radical and a carbon atom forming a part of a pyrazolone nucleus, and $R_1$ and $R_2$ are alkyl radicals, at least one of which is substituted with a radical selected from the group consisting of cyano, alkylcarboxy, nitro, carboxy, sulfo, chloro, hydroxy and methoxy, said dyestuff further containing outside of the said

grouping a substituent which renders the dyestuff fast to diffusion in gelatin emulsions and a substituent selected from the class consisting of sulfonic acid and carboxylic acid groups.

References Cited in the file of this patent

UNITED STATES PATENTS

| Number | Name | Date |
|---|---|---|
| 2,036,546 | Schneider | Apr. 7, 1936 |
| 2,186,731 | Schneider | Jan. 9, 1940 |
| 2,186,849 | Wilmanns et al. | Jan. 9, 1940 |
| 2,449,966 | Hanson | Sept. 21, 1948 |

FOREIGN PATENTS

| Number | Country | Date |
|---|---|---|
| 513,596 | Great Britain | Oct. 17, 1939 |